Feb. 27, 1923. 1,447,048.
H. E. SHELLER.
STEERING WHEEL.
FILED DEC. 14, 1921.

Inventor
Harry E. Sheller
By Brown & Thomas
Attorneys

Patented Feb. 27, 1923.

1,447,048

UNITED STATES PATENT OFFICE.

HARRY E. SHELLER, OF PORTLAND, INDIANA, ASSIGNOR TO SHELLER WOOD RIM MANUFACTURING COMPANY, OF PORTLAND, INDIANA, A CORPORATION OF INDIANA.

STEERING WHEEL.

Application filed December 14, 1921. Serial No. 522,264.

*To all whom it may concern:*

Be it known that I, HARRY E. SHELLER, a citizen of the United States of America, residing at Portland, in the county of Jay and State of Indiana, have invented certain new and useful Improvements in Steering Wheels, of which the following is a specification.

The invention relates to improvements in steering wheels.

It is an object of the invention to provide a steering wheel in which the spokes are permanently united to a plastic rim.

A further object of the invention is to provide a steering wheel wherein the spokes along the sides or edges thereof are formed with pockets and adapted to be placed within a plastic steering rim during vulcanization thereof whereby the material of the rim flows into said pockets to assist in anchoring the rim in position.

In the accompanying drawings I have shown a single embodiment of my invention, in which Figure 1 is an elevation of the wheel and spokes.

Figure 1:
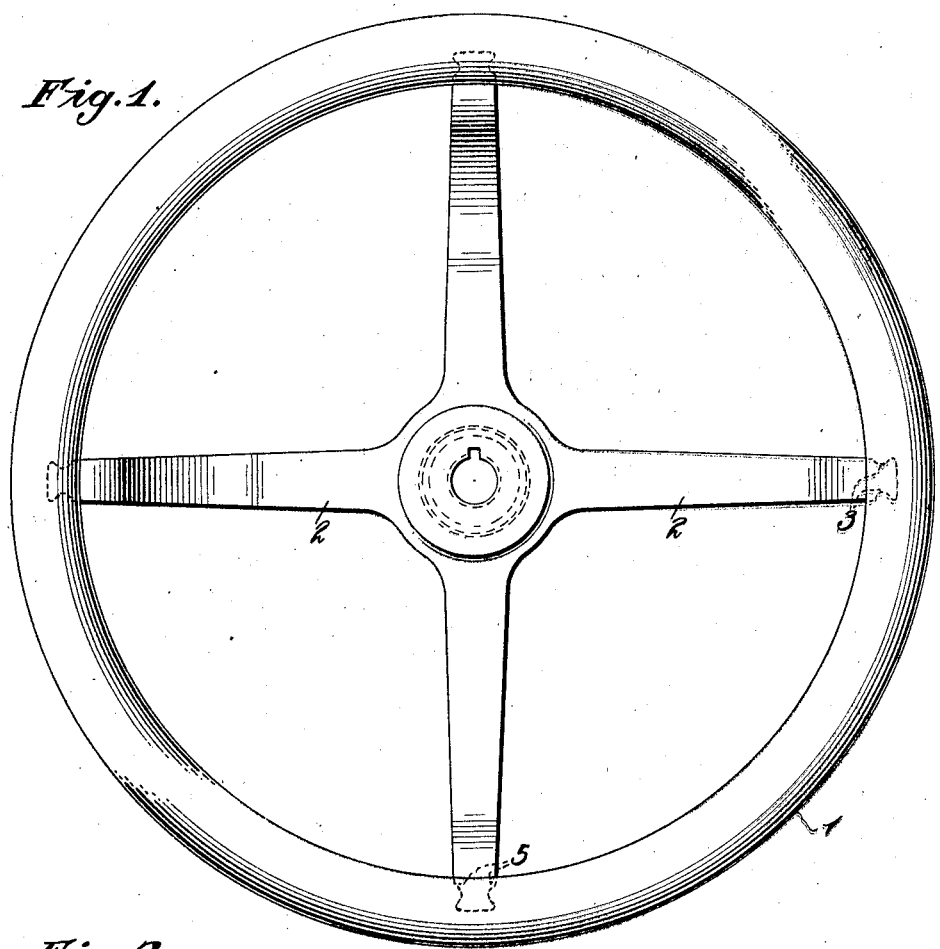
Figure 2:
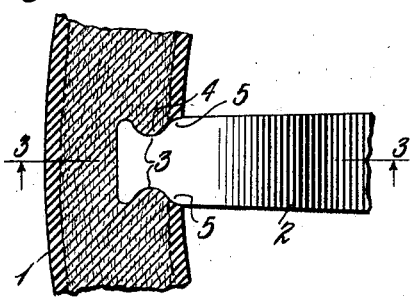
Figure 2 is a sectional view of one form of the invention.
Figure 4:
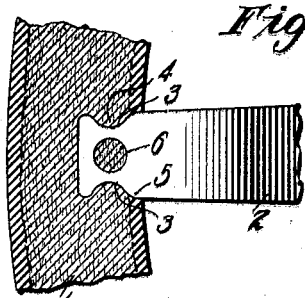
Figure 4 is a transverse section.

Referring now more specifically to the drawings, wherein like reference characters indicate corresponding parts, the numeral 1 designates the rim of a steering wheel, which is preferably composed of vulcanized rubber, and other like plastic materials. When the material from which the rim is formed is in an unvulcanized or soft state, the same is pierced and the spokes 2 inserted therein to be embedded in the rim during vulcanization, which may be and is preferably carried out under pressure.

The spokes 2, as will be clearly observed, are of substantially uniform width throughout their length, but at the outer ends of said spokes I provide pockets 3 which are formed by removing a part of the material forming the spokes. These pockets are of a curved formation, providing spaces receiving the filling material 4. The pockets or cutout portions in the sides of the spokes 2, as will be observed, are located so as to be within the end of each spoke, providing shoulders 5 at the ends of each spoke. It will be seen that the material freely flows within the exposed pockets in the side edge of the spoke during vulcanization, and of course when hardened by a vulcanization provides an efficient means for anchoring the spokes in position.

Figure 3:
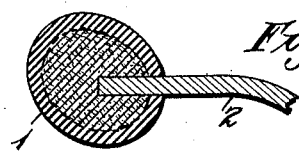
Figure 3 is a sectional view of a modified form.

In the modified form of my invention shown in Figure 3 I may also form within the spoke 2 an aperture 6 located between the cutout portions or pockets 3, which aperture likewise receives material constituting the rim and provides additional means for anchoring the spoke to the rim. This opening or aperture 6 may be dispensed with if desired, and is preferably only used when a wheel requiring very heavy duty is employed.

It will be appreciated that the spokes 2 are of substantially uniform width throughout their length, and if anything, are slightly smaller at their ends than at the spider. The ends of the spokes are embedded in the plastic rim and these ends are not of an enlarged width which permits the plastic material to flow in and around shoulders serving to correctly anchor said spokes in position. It is thought that it will be appreciated that the rim 1 is of much greater strength where the embedded end portions of the spokes are not enlarged, but to do this, it is necessary to form the pockets in the sides of each spoke.

Having thus described my invention, what I claim is:

A steering wheel, comprising a hub, of a plurality of metallic spokes radiating therefrom, the outer ends thereof being of a width not exceeding the width of the intermediate portions of said spokes, a plastic rim in which the outer ends of said spokes are embedded, said spokes being formed along each side edge intermediate the ends thereof with cutout portions providing pockets having opposed shoulder surfaces, the pockets in said spokes being adapted to receive the plastic material of the rim to anchor the rim to said spokes.

In testimony whereof I affix my signature.

HARRY E. SHELLER.